United States Patent
Jones, Jr. et al.

(10) Patent No.: US 7,998,394 B1
(45) Date of Patent: Aug. 16, 2011

(54) METHOD FOR MAKING A FLEXIBLE FISHING LURE THAT TRAPS AIR

(76) Inventors: Nyles Kelley Jones, Jr., Deer Park, TX (US); Nyles Kelley Jones, Sr., La Porte, TX (US)

( * ) Notice: Subject to any disclaimer, the term of this patent is extended or adjusted under 35 U.S.C. 154(b) by 88 days.

(21) Appl. No.: 12/184,592

(22) Filed: Aug. 1, 2008

(51) Int. Cl.
*B29C 41/46* (2006.01)

(52) U.S. Cl. ........................................... 264/319

(58) Field of Classification Search .............. 264/319; 43/42.24, 4.5; 249/114.1
See application file for complete search history.

(56) References Cited

U.S. PATENT DOCUMENTS

| | | | |
|---|---|---|---|
| 4,069,610 A * | 1/1978 | Firmin | 43/42.24 |
| 6,775,944 B1 * | 8/2004 | Jones, Jr. | 43/4.5 |
| 6,948,695 B1 * | 9/2005 | Clark | 249/114.1 |

\* cited by examiner

*Primary Examiner* — Christina Johnson
*Assistant Examiner* — Larry Thrower
(74) *Attorney, Agent, or Firm* — Buskop Law Group, PC; Wendy Buskop

(57) ABSTRACT

A method for making an integrally molded flexible fishing lure, comprising: creating a mold of a lure design, having a head integral with an egg sack, a body integral with the egg sack, and a tapered tail integral with the body. The head, body and tail have a smooth surfaces with a plurality of concentric ridges. At least two air trapping cavities are disposed in the body for trapping and retaining air during lure movement. A polymer comprising polypropylene, polyethylene, urethane, elastomer, or combinations thereof, is poured into the mold, the mold is cured, and the integrally molded flexible fishing lure is removed from the mold forming a lure with air trapping cavities.

8 Claims, 3 Drawing Sheets

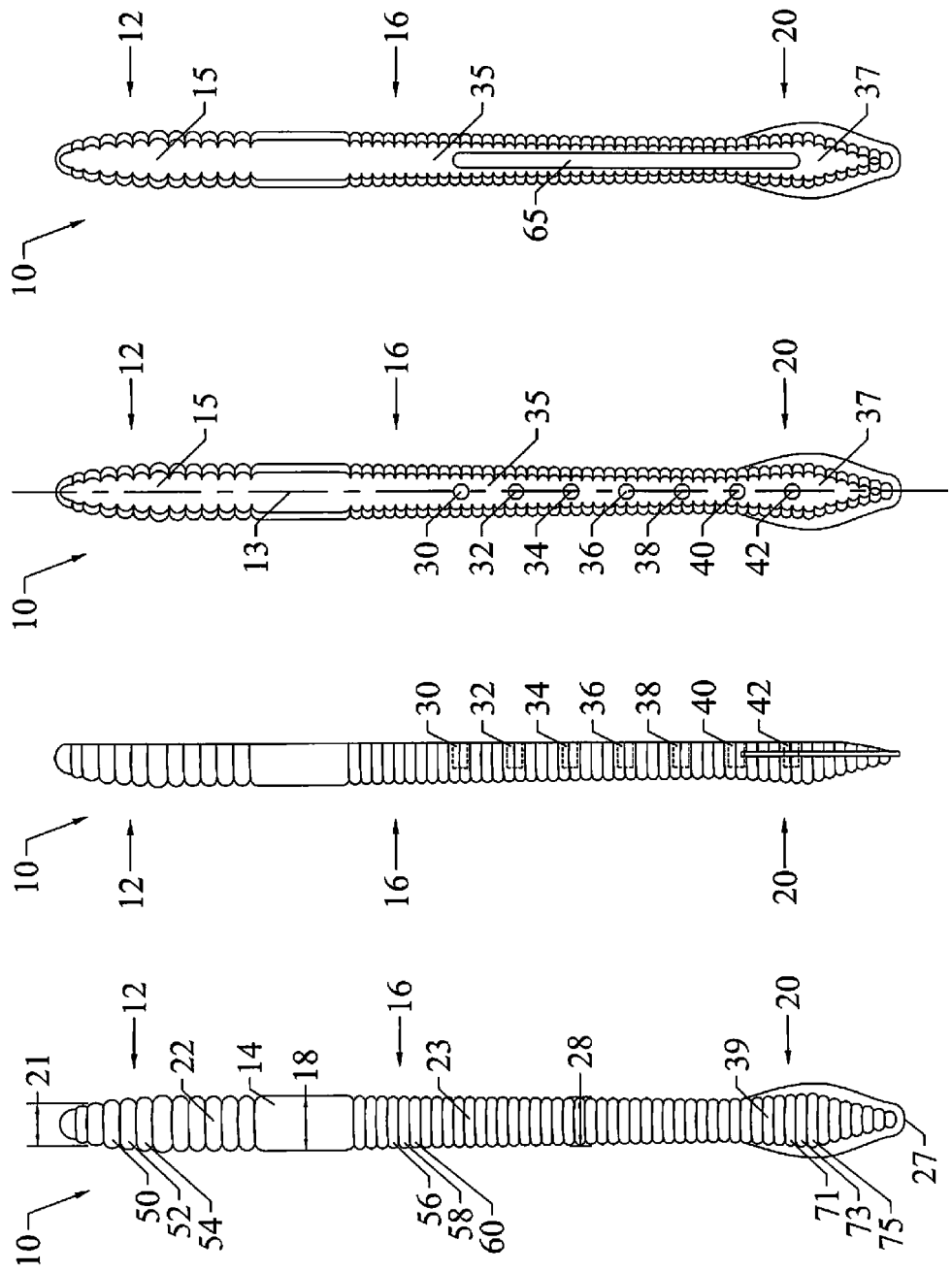

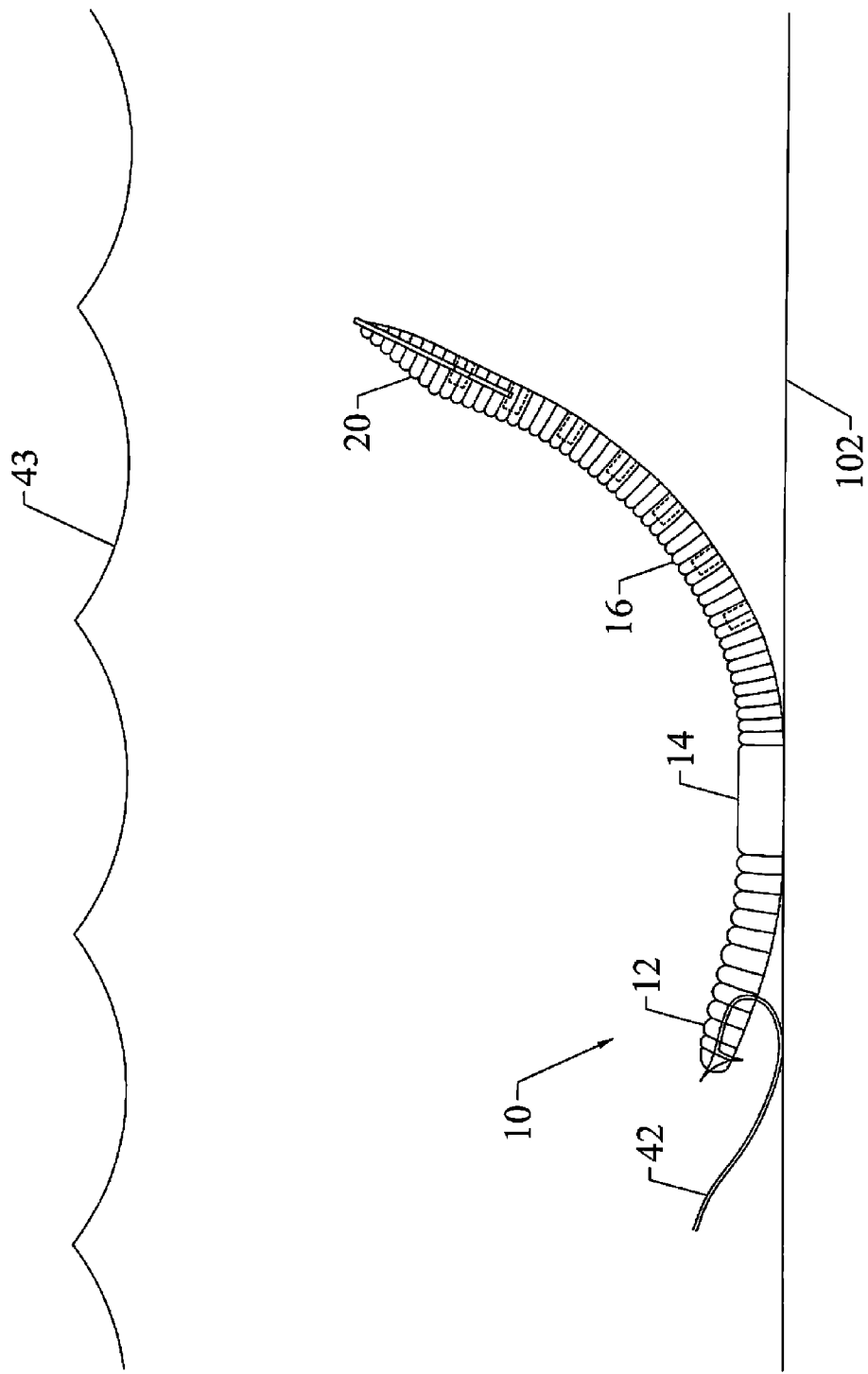

METHOD FOR MAKING A FLEXIBLE FISHING LURE THAT TRAPS AIR

FIELD

The present embodiments relate to a method for making an integrally molded one-piece flexible fishing lure, as known herein as "fish bait".

BACKGROUND

A need exists for a fast and efficient method for making a mold design of an integrally molded one-piece flexible fishing lure that is able to produce large quantities of lures inexpensively due to the potential for loss of a lure during use.

A need also exists for a method for making a flexible fishing lure which has the appearance of a live worm while resting on the bottom or floating in a body of water, through use of a floating tail that traps air.

A further need exists for a method for making a lure with an egg sack that has a realistic appearance while dropping to the bottom of a body of water.

The present embodiments meet these needs.

BRIEF DESCRIPTION OF THE DRAWINGS

The detailed description will be better understood in conjunction with the accompanying drawings as follows:

FIG. 1 is a top view of the flexible fishing lure.
FIG. 2 is a side view of the flexible fishing lure.
FIG. 3 is a bottom view of the flexible fishing lure.
FIG. 4 is an alternative view of the flexible fishing lure.
FIG. 5 is a side view of the flexible fishing lure being used in a body of water.

Figure 6:
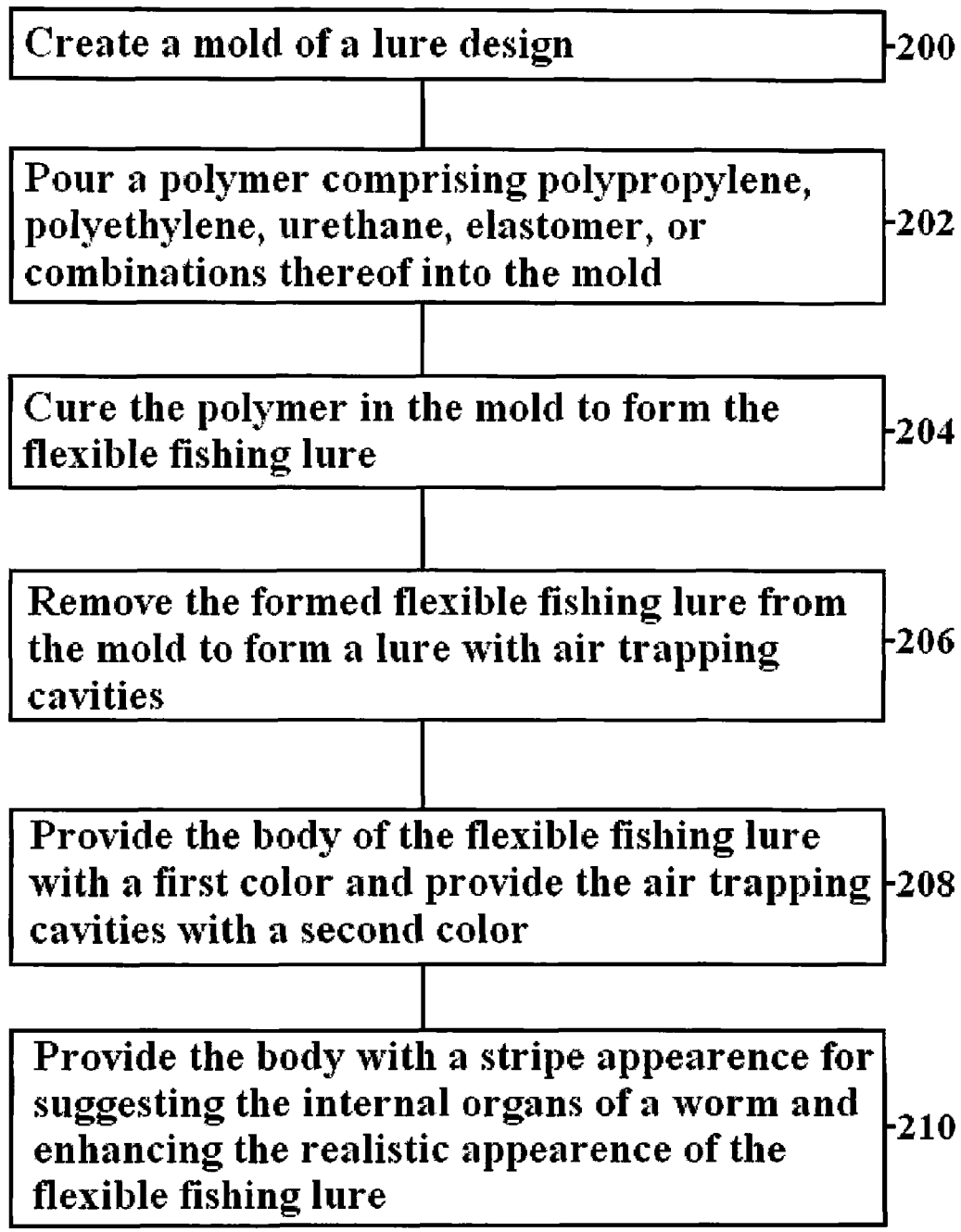
FIG. 6 shows a flowchart of an embodiment of the present method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for making a flexible fishing lure that appears to be live worm while resting on the bottom with its tail up, and into the current or water while the head is on the bottom of a body of water, such as a lake, pond, creek, sea, ocean, or the like.

The method of making a flexible fishing lure includes creating a mold design that represents a worm figure having a head integral with an egg sack, a body integral with the egg sack, and a tapered tail integral with the body. The head, body and tapered tail can each have a smooth side covering about ¼ of the circumference of the overall lure and can have a ridged side covering the remainder of the outside of the lure.

The head, egg sack, body and tail can be aligned along the central axis of the lure.

The flexible fishing lure is typically about 4 inches to about 8 inches long, but in an embodiment, can range from about 3 inches to about 12 inches in length.

The flexible fishing lure can have a tapered diameter from body to tail, generally ranging from about 1/16 inches to about ¼ inches in diameter. The egg sack is contemplated to have a diameter at least 10 percent larger than the diameter of the body or the head.

At least two air trapping cavities can be disposed in the body smooth side and adjacent to each other along a central axis of the flexible fishing lure for trapping and retaining air during movement of the lure in water. The tail can be tapered to a point and can raise in water as air is trapped in the air trapping cavities maintaining the tail at an elevated position in relation to the head, when the head is secured to a hook in water.

In an embodiment, the method of making the flexible fishing lure can include pouring into the mold a material for a lure construction that includes a solid polymer, such as a blend of elastomer and clear polypropylene, polyethylene, urethane, combinations thereof, or any other comparable materials capable of creating a slightly gummy but wiggly lure when pulled through water.

It is also contemplated that the flexible fishing lure can be made from a polymer mixed with a scent. The scent can be a blood worm scent, a crawfish sent, a garlic sent, or an additional scent that may attract fish.

The polymer can be mixed with light reflecting sparkles to attract fish.

The polymer can be mixed with pigment to enhance the realistic appearance or visibility of the lure.

The polymer can be mixed with an additive to cause apportion of the lure to appear opaque.

In an embodiment, the polymer can be transparent.

The method of making the flexible fishing lure can further include a curing of the polymer in the mold.

Once cure, the formed flexible fishing lure can then be removed from the mold.

It is contemplated that the method of making the flexible fishing lure can include pouring into the mold additional additives, like flecks, or pigmentation mixed into the polymer, providing the lure with light reflecting portions and/or color, such as brown, red, or translucent orange.

The head of the flexible fishing lure can be engaged to a hook, with or without a weight, that can drop to the bottom of a body of water. The tail, with the air trapping cavities, rises above the head and hook, imitating a live worm that burrows in the bottom of a lake bed or other area on the bottom of a body of water.

The body of the flexible fishing lure can have a first color, and at least one of the cavities can have a second color. The color can be added manually, using markers or similar coloring means once the flexible fishing lure is removed from the mold.

Color can also be added to the concentric ridges or the smooth surface along the body and/or tail. Use of color can provide the flexible fishing lure with the appearance of a real worm for attracting fish.

In addition to having a color, it is contemplated that a portion of the body can be at least partially transparent with or without clear pigments.

The method of making the flexible fishing lure can further include using a mold design that provides for a unique tail portion (or the second portion of the worm) having at least two air trapping cavities. From 2 air trapping cavities to 12 or more air trapping cavities can be made in the lure using the mold.

In an embodiment, the air trapping cavities are formed during the flexible fishing lure molding process. The mold can have at least two small dowels having a cylindrical shape and a diameter of no more than about 1 millimeter. A plurality of small dowels can be used around which the polymer is poured and then cured forming air trapping cavities that can have a circular shape. In additional embodiments, the air trapping cavities can have other geometrical shapes.

Once removed, the small dowels form air trapping cavities in the body. The air trapping cavities are long and penetrate through most of the diameter of the body, though not through the entire diameter of the body.

The air trapping cavities are long enough to trap small amounts of air in one end while closing off at the edge of the body, creating small air pockets. The air can be removed, if desired, by squeezing the tail.

In an alternative embodiment, the air trapping cavities can be formed by drilling, punching, or cutting holes in the tail and or body portion of the worm, after removing the cured flexible fishing lure from the mold. Additional methods can be used in this embodiment.

A channel can be formed in the flexible fishing lure in yet another embodiment. This can be done by using a scalpel or laser to make a small but accurate incision that does not penetrate all through the one-piece flexible fishing lure and is in a cut parallel to the central axis.

In an example of using the flexible fishing lure, the retained air enables in the second portion of the body cause the "tail" to rise up, above the bottom of a body of water, and provide the appearance of a burrowing worm protruding from its hole, and boldly sticking up, ready for feeding.

The flexible fishing lure can retain air in one half of the body or part of the tail.

It is contemplated that the method of making the flexible fishing lure will create a worm having holes that enable the air to provide the one-piece flexible fishing lure with a graceful movement when submerged in water, having a raised tail.

In an embodiment, the method of making the flexible fishing lure can include providing a worm mold that has a shovel-like head. In additional embodiments, the worm mold can further have a symmetrical pen-shaped head or a round like head.

The egg sack can have a cylindrical shape and can have a smooth outer surface, whereas in an embodiment, both halves of the body on either side of the egg sack can have ridges, like a real worm, creating the appearance of a real worm to attract fish. The egg sack can be slightly larger in diameter, such as about 10 percent larger, than either of the halves of the body attached to the egg sack.

In an embodiment, the method of making the flexible fishing lure can include providing a worm mold that has a head and body with a cylindrical shape.

The flexible fishing lure can have a length ranging from about 3 inches to about 12 inches from the end of the head to the end of the tail. The flexible fishing lure can be a single color, or the flexible fishing lure can have multi-colorings.

The air trapping cavities in the body can be of a general circular shape. Other shapes, such as elliptical shapes, are also contemplated.

During operation, it is contemplated that the tail of the flexible fishing lure rises and remains in an elevated position when submerged in water or resting at the bottom of a body of water, due to air trapped in the cavities.

FIG. 1 depicts the flexible fishing lure (10) with a head (12) integral with an egg sack (14). The head (12) has a plurality of concentric ridges (50, 52, and 54), only three are shown in this Figure, along a head ridged side (22). The head (12) has a head diameter (21) which can be about ¼ inch.

The egg sack (14) is shown as a generally smooth, cylindrical section having an egg sack diameter (18) that is about 10 percent bigger than the head diameter (21) and the body diameter (28) Secured to the egg sack, opposite the head is a body (16). Secured to the body (16) is a tail (20) that tapers to a point (27).

The body (16) has a plurality of concentric ridges (56, 58, and 60) along a body ridged side (23).

The tail (20) has a plurality of concentric ridges (71, 73, and 75) along the tail ridged side (39).

FIG. 2 shows a side view of the flexible fishing lure, cut down the middle of the top side and revealing 7 air trapping cavities, (30, 32, 34, 36, 38, 40, and 42). Additional air trapping cavities or less can be used.

FIG. 3 shows the smooth side of the head (15), the smooth side of the body (35) and the smooth side of the tail (37). FIG. 3 further show the air trapping cavities from a front view (30, 32, 34, 36, 38, 40 and 42), All air trapping cavities can be disposed in the smooth sides, and can be aligned with one another, along the central axis (13) of the one-piece flexible fishing lure.

The air trapping cavities can trap and retain less than about 1 milliliter of air during use and can provide the one-piece flexible fishing lure with movement while under water. Air can enter the air trapping cavities, while the one-piece flexible fishing lure is out of water. When submerged, the polymer from which the one-piece flexible fishing lure is made can close around the air trapping cavities, enabling the high tail swishing action to make the one-piece flexible fishing lure seem like a worm which is real and alive, attracting fish.

FIG. 4 shows an embodiment of the air trapping cavities as a channel (65) disposed in the smooth side of the body (35) of the flexible fishing lure (10).

FIG. 5 shows the flexible fishing lure (10) with the head (12) attached to a hook (42) resting on the bottom (102) of a body of water. The flexible fishing lure is shown in water (43) with the tail (20) rising up while in the water. The head of the flexible fishing lure is shown rising above the hook due to air trapped within the air trapping cavities.

FIG. 6 depicts the steps of the method described herein.

Step 200 is the step of creating the unique mold having the flexible fishing lure design creating air pockets in the body and or tail of the worm Step 202 is the step of pouring a polymer comprising polypropylene, polyethylene, urethane, elastomer, or combinations thereof, into the mold.

Step 204 is the step of curing the polymer in the mold forming the flexible fishing lure.

Step 206 is the step of removing the formed lure from the mold creating a flexible fishing lure with air trapping cavities.

Step 208 is the step of coloring the body of the flexible fishing lure with a first color and providing the at least two air trapping cavities with a second color.

Step 210 is the step of providing the body with a striped appearance for suggesting the internal organs of a worm and enhancing the realistic appearance of the flexible fishing lure.

It is contemplated that these air trapping cavities can be used in other designer lures, such as applicant's own Weedless Wacky Worm™ described in the patent applications having application Ser. No. 10/235,330, and application Ser. No. 10/235,307 each filed Sep. 5, 2002, now U.S. Pat. No. 6,843,016 and U.S. Pat. No. 6,775,944, the entirety of which are incorporated herein by reference.

While these embodiments have been described with emphasis on the embodiments, it should be understood that within the scope of the appended claims, the embodiments might be practiced other than as specifically described herein.

What is claimed is:

1. A method for making a flexible fishing lure, wherein the method comprises:
   a. providing a polymer comprising polypropylene, polyethylene, urethane, elastomer, or combinations thereof, to a mold representing a fishing lure, wherein the mold representing the fishing lure comprises a dowel centrally located therein; and
   b. curing the polymer in the mold, wherein an air trapping and releasing cavity is formed into the polymer by the dowel as the polymer cures;
   wherein the fishing lure consists of: a head connected to an end of a body; and a tail connected to an end of the body opposite the end of the body connected to the head, wherein the tail and the body each comprise a smooth side and a ridged side, wherein each smooth side comprises a plurality of air trapping and releasing cavities axially aligned with each other along a central axis of the body, wherein each ridged side is absent of any air trapping and releasing cavities, and wherein each of the plurality of air trapping and releasing cavities has a depth perpendicular to the central axis that is greater than a diameter of that air trapping and releasing cavity, and wherein the head consists of a smooth side absent of any air trapping and releasing cavities and a ridged side absent of any air trapping and releasing cavities.

2. The method of claim 1, further comprising removing the cured polymer from the mold, wherein the cured polymer is in the form of a fishing lure having a body, wherein a tail is connected to one end of the body, and a head is connected to another end of the body, and the air trapping and releasing cavity is formed into the body along a central axis thereof.

3. The method of claim 2, further comprising coloring the air trapping and releasing cavity once the cured polymer is removed from the mold.

4. The method of claim 1, further comprising mixing a pigmentation into the polymer prior to providing the polymer to the mold.

5. The method of claim 1, wherein the cured polymer is solid, transparent, or opaque.

6. A method for making a flexible fishing lure, wherein the method comprises:
   a. providing a polymer comprising polypropylene, polyethylene, urethane, elastomer, or combinations thereof, to a mold representing a fishing lure, wherein the mold representing the fishing lure comprises a plurality of dowels centrally located therein; and
   b. curing the polymer in the mold, wherein a plurality of air trapping and releasing cavities are formed into the polymer by the plurality of dowels as the polymer cures;
   wherein the fishing lure consists of: a head connected to an end of a body; and a tail connected to an end of the body opposite the end of the body connected to the head, wherein the tail and the body each comprise a smooth side and a ridged side, wherein each smooth side comprises a plurality of air trapping and releasing cavities axially aligned with each other along a central axis of the body, wherein each ridged side is absent of any air trapping and releasing cavities, and wherein each of the plurality of air trapping and releasing cavities has a depth perpendicular to the central axis that is greater than a diameter of that air trapping and releasing cavity, and wherein the head consists of a smooth side absent of any air trapping and releasing cavities and a ridged side absent of any air trapping and releasing cavities.

7. The method of claim 6, further comprising coloring the air trapping and releasing cavities once the cured polymer is removed from the mold.

8. The method of claim 6, further comprising mixing a pigmentation into the polymer prior to providing the polymer to the mold.

* * * * *